United States Patent [19]
Collins et al.

[11] Patent Number: 5,556,906
[45] Date of Patent: Sep. 17, 1996

[54] ADHESIVE COMPOSITION

[75] Inventors: Peter J. Collins, Glen Waverley; Yoshikazu Yazaki, Moorabbin, both of Australia

[73] Assignees: Commonwealth Scientific and Industrial Research Organisation; Chemplex Australia Limited, both of Melbourne, Australia

[21] Appl. No.: 940,875

[22] PCT Filed: May 3, 1991

[86] PCT No.: PCT/AU91/00181

§ 371 Date: Jan. 4, 1993

§ 102(e) Date: Jan. 4, 1993

[87] PCT Pub. No.: WO91/17224

PCT Pub. Date: Nov. 14, 1991

[30] Foreign Application Priority Data

May 3, 1990 [AU] Australia ............................. PJ 9924/90

[51] Int. Cl.$^6$ ................................ C08K 5/02; C09J 4/00; C09J 101/00; C09J 201/00

[52] U.S. Cl. ........................... 524/463; 524/47; 524/462; 156/331.3; 156/331.7; 156/331.9; 156/335

[58] Field of Search ................................. 524/156, 462, 524/47, 463; 156/331.3, 331.7, 331.9, 335

[56] References Cited

U.S. PATENT DOCUMENTS

| | | | |
|---|---|---|---|
| 3,538,031 | 11/1970 | Rice | 260/27 |
| 4,026,856 | 5/1977 | Jahnke | 524/843 |
| 4,197,219 | 4/1980 | Damico | 260/7 |

*Primary Examiner*—Paul R. Michl
*Assistant Examiner*—LaVonda DeWitt
*Attorney, Agent, or Firm*—Birch, Stewart, Kolasch & Birch, LLP

[57] ABSTRACT

Adhesive compositions comprising an aqueous based adhesive and one or more hydrophilic hydrocarbon surfactant(s) or fluorochemical surfactants and methods for bonding porous materials are described which are particularly suitable for bonding high density and/or high moisture content woods. Methods for bonding timber veneer and improving bond cure rates are also disclosed.

46 Claims, No Drawings

ADHESIVE COMPOSITION

This invention relates to adhesives and in particular to aqueous adhesives for use with porous materials. The invention is also concerned with methods for bonding porous material and for reducing cure times and bonding at higher moisture content.

In aqueous adhesive systems such as the phenolic type resins used for bonding wood products such as plywood, a certain degree of water removal from the glueline is necessary for the formation of a good bond. Without wishing to limit the present invention in any way, we believe that bond failure may be caused by the presence of excessive moisture in or near the glueline at the time of application of pressure. When heat is applied to the product to set the resin, steam is formed at the interface resulting in a weak bond. In extreme cases, the bonded articles may be blown apart by the steam pressure generated during the heating step. Excessive resin loss from the glueline during hot pressing may also occur. To avoid this situation very long assembly times may be required to allow water to migrate from the glueline into the porous substrate. Another problem that may be encountered is excessive resin penetration into the substrate so that insufficient resin remains for bonding.

It is an object of the present invention to provide an improved adhesive system which facilitates more rapid removal of water from the glueline.

We have found, surprisingly, that the objective of the present invention can be achieved by either incorporating one or more hydrophilic surfactants in the adhesive formulation, or by applying a hydrophilic surfactant to the surface of the porous material prior to the application of an adhesive.

Accordingly, in one aspect, the present invention provides an adhesive composition for bonding porous material, said composition comprising an aqueous based thermosettable resin and one or more hydrophilic anionic surfactant(s) having an HLB value of at least about 10.

In a further form, the present invention provides a method of bonding a porous material, said method including the steps of:

applying a hydrophilic anionic surfactant having an HLB of at least about 10 to at least a portion of a surface of the porous material; and applying an aqueous adhesive thermosettable to at least a portion of the surfactant treated surfacer.

In yet a further aspect, the present invention provides a method of bonding a porous material, said method including the step of applying an adhesive composition in accordance with the invention.

The invention is applicable to porous material of any form, for example, it may be sheet-like as in the case of plaster sheeting or timber veneer or it may be particulate. The porous material may be a combination of porous materials or it may be a combination of porous and non-porous material (such as metal or plastic). The formed product may be, for example, any bonded composite product, examples of which are particle board, plywood and various fibre boards.

Suitable adhesives are thermosettable resins including phenolic resins, resorcinol resins, melamine resins, urea resins, urethane resins and starch-type adhesives. The adhesive may also be of the addition polymer type. Preferably the adhesive is an aqueous phenol-formaldehyde resin. For the purpose of this specification the term hydrophilic surfactant extends to fluorochemical surfactants even though, technically, they may not be regarded as such.

The hydrophilic anionic surfactants may be selected from the group comprising fluorochemical type surfactants which may sufficiently lower the surface tension of water in the adhesive composition to result in water phase surface tensions lower than that of the surface energy of the porous material and hydrophilic hydrocarbon-derived surfactants with HLB numbers of about 10 or greater.

Mixtures of surfactants may be used provided they are self-compatible. Some surfactants are unstable or are degraded under the alkaline or acidic conditions commonly encountered in gluing wood, and for this purpose we prefer to use stable surfactants. The amount of surfactant to be used depends largely on the type of surfactant chosen, the moisture content of the porous material (and in the case of wood, the species to be glued), the glue formulation and the glue loading. In the case of a hydrocarbon-derived surfactant, the surfactant may be present in an amount in the range 0.1–2.0%. The fluorochemical surfactant may be present in an amount in the range of 0.001 to 0.500%.

We have further discovered that the adhesive composition in accordance with the invention substantially reduces the cure time for bonding thus enabling reduced press times, increased productivity and more reliable reproduction of bond quality.

Accordingly, in a further aspect, the present invention provides a method for reducing bond cure time comprising applying an adhesive composition comprising an aqueous based thermosettable resin adhesive and one or more hydrophilic anionic surfactant(s).

DETAILED DESCRIPTION OF THE INVENTION

One particular application of the present invention may be found in the manufacture of products made from difficult to glue hardwood species. However, it is to be emphasised that the invention is not limited to this particular type of wood or wood in general and other porous materials are included within the scope of the invention.

Since the availability of the more traditional wood species such as those obtained from rain forests is decreasing, particularly for use in plywood manufacture owing to ecological concerns, some plywood manufacturers have turned their attention to the use of high density species, especially eucalypt species, as substitutes for the more traditional rain forest species. However, the use of such high density species has not been altogether successful since these species are somewhat more difficult to bond using traditional phenolic adhesives, and it has been found that presently available phenolic resins produce poor adhesive bonds with plywood manufactured from high density eucalypt species such as, for example, Blackbutt.

One cause of the poor bonding is thought to be the extraction of undesirable materials from the wood surface at the interface between the adhesive and the wood. These extracted materials are thought to react with the methylol groups of the phenolic resin, thus affecting the ability of the phenolic resin to crosslink in its intended manner. Our International Patent Specification No. PCT/AU89/00514, now WO 9006347-A1, the disclosure of which is incorporated herein by reference, discloses a method of overcoming this problem through the addition of certain di- and multi-functional compounds capable of reacting with aldehyde or methylol groups and having greater reactivity towards these groups than do wood extractives.

Another method of minimising the interaction between the adhesive and extractives from the wood is also disclosed in our International Patent Specification No. PCT/AU89/

00514. This method involves treating the wood substrate to be glued with certain metallic compounds or complexing agents or, alternatively, incorporating these materials in the adhesive prior to its application to the wood surface. These additives are believed to react with the extractives within the wood or bark to substantially negate the deleterious effects of the extractives so that superior adhesive performance is obtained.

The adhesive compositions disclosed in the aforementioned patent applications can satisfy the gluebond requirements for Type A waterproof plywood made from high density eucalypt species such as Blackbutt. However, it has been found that the gluing conditions to obtain Type A bonds are relatively limited. For example, using one such formulation we have found that the moisture content of the veneers must be about 5% or less and the glueline moisture meter readings must be between about 19 and 22 if satisfactory performance is to be obtained. Glueline moisture meter readings in this range are reached only after relatively long assembly times before hot pressing to cure the adhesive. The total assembly time to obtain acceptable glueline moisture meter readings can be excessively long, e.g. over 60 minutes, which slows down the rate of plywood production. The drying of veneers down to 5% moisture content or less is expensive and the relatively long times required reduce dryer throughput. Furthermore, for satisfactory results veneer qualities such as thickness must be kept within close limits and the veneers must be peeled as tightly as possible.

We have found that many of the above limitations are due to the very low compressibility of veneers at the low moisture content required for satisfactory bonding. A higher moisture content allows greater compressibility and thus better contact between the surfaces to be glued, but it results either in excessive resin loss from the glueline during hot pressing or necessitates very long assembly times to allow water to migrate from the glueline into the veneer. Furthermore, with high density and high strength species such as Blackbutt and Flooded Gum better bonding is usually obtained by using higher glue loadings, but higher glue loadings mean there is more water to be removed from the glueline before hot pressing so that assembly times are unduly prolonged.

By employing a hydrophilic surfactant either in the adhesive composition itself or as a pretreatment of the veneer prior to the application of an adhesive, in accordance with the invention, we have been able to facilitate more rapid removal of water from the glueline, enabling the use of higher moisture content veneers without excessive assembly times and with relatively less sensitivity to variations in veneer quality. The invention has particular application to the manufacture of Type A waterproof plywood.

Thus, in a further embodiment of the invention we provide a method of bonding timber veneer, in the manufacture of plywood comprising:

treating a veneer with one or more hydrophilic surfactants;

applying an aqueous adhesive to at least one surface of the veneer;

contacting the thus coated surface of the veneer with a surface of an adjacent sheet; and applying heat and pressure to the sheets so as to effect bonding of the veneer, said one or more hydrophilic surfactants being included in the adhesive and/or being applied prior to application of the adhesive.

As mentioned above, the amount of hydrophilic surfactant to be used depends largely on the type of surfactant chosen, the moisture content of the wood substrate, the wood species to be glued, the glue formulation and the glue loading. However, in general very large amounts (up to 2% by weight based on the weight of resin) of ordinary hydrocarbon-derived hydrophilic surfactants or small amounts (less than 1%) of very powerful specific hydrophilic surfactants such as the fluorochemical surfactants may be required to decrease the glueline moisture content to an appropriate level in a reasonable period of time and to produce the desired improvement in bond quality.

Although the resins conventionally used as adhesives in the manufacture of Type A waterproof plywood are generally of the phenolic (phenol-formaldehyde) type, the present invention is broadly applicable to other adhesive resin systems such as urea-formaldehyde, resorcinol-formaldehyde and melamine-formaldehyde. Adhesives not containing formaldehyde, for example urethane, may also be used.

The adhesive compositions of the invention may have one or more advantages which may be summarised as follows:

(a) higher moisture content veneers, which are more compressible and allow closer contact of the adjacent surfaces to be glued, can be used, which results in reduced veneer drying time and cost, increased dryer capacity, and lower rejection rate because of wet patches;

(b) the higher glue spreads needed for satisfactory bonding of the higher density and strength veneers can be used without prolonging assembly time;

(c) more rapid removal of excess water allowing reduced assembly time before the spread veneers are ready for hot pressing;

(d) widening of the time interval over which satisfactory gluing may be achieved;

(e) faster cure cycle resulting in reduced press times increased productivity and more uniform bond quality;

(f) improves the tack of adhesive systems without the use of tackifiers; and (g) improvement in gluebond quality and consistency enabling the bonding of "difficult to glue" materials.

The rate of water removal from the glueline is conveniently monitored by changes in the readings obtained from a resistance-type moisture meter, the electrodes of which penetrate the glueline. Using such an instrument, and a glue formulation in accordance with the present invention, we have found there is a relationship between the glueline moisture readings and the gluebond quality. For example, when Blackbutt veneers of 5.5% and 9.0% moisture content respectively were used, the moisture meter readings were found to drop very quickly after glue spreading and then to stabilise. Within an assembly time of about 25 to about 120 minutes the samples could be hot pressed to produce Type A bonded plywood.

In general, the optimum glueline moisture content indicated by the meter reading depends on the glue formulation, the glue loading, the moisture content of the wood substrate and the wood species. However, in practice this can be obtained from the results of gluing tests.

The adhesive compositions of the invention are not restricted to the gluing of the aforementioned difficult to glue species but may be used with other hardwood and softwood species. They are also applicable to the gluing of wood which has been treated with fire retardants or preservative agents such as oils, creosote or inorganic salts. They are particularly suitable for gluing wood which has been treated with the preservative known as copper chrome arsenic (CCA).

Apart from their use in the manufacture of plywood, the compositions of the invention may be used to advantage in finger-jointing and in the manufacture of other reconstituted wood products such as laminated timber, laminated veneer lumber and particle board, as well as in the bonding of wood to metals.

The adhesive compositions of the invention may preferably also contain additives reactive to methylol groups or formaldehyde, such as those disclosed in our aforementioned International Patent Application PCT/AU89/00514, now WO 9006347-A1 as useful in negating the effects of extractives in the wood substrate. Other additives and filler materials such as methyl propyl cellulose, wood flour, shell flours, wheat flour, calcite or kaolin may also be included.

In order that the invention may be more readily understood we provide the following non-limiting examples.

MATERIALS

Resins used:
PP775, PP1597, PP1598, PP1604 are alkaline resole phenol-formaldehye resins of 40–42% total solids content, 5–8% NaOH, 1.8–2.0 F/P mole ratio and a viscosity between 280–315 cps at 25° C. PR900 is a Resorcinol formaldehyde resin of 54–57% total solids content using the 20% addition of a nutshell flour filler/paraformaldehyde hardener. All resins used were manufactured by Chemplex Australia Ltd and all have long term stability, i.e. 6–8 weeks at 25° C. or more than 12 months in the case of PR900.

Surfactants used:
Gardinol CX is sodium cetyl/oleyl sulphate, Empicol LZ and LS 30/P is sodium lauryl sulphate (HLB no. of 40) both supplied by Albright & Wilson Australia. FC100 and FC129 are fluorochemical surfactants supplied by 3M Australia.

Accelerators:
Examples of suitable accelerators are aminophenols, polyhydroxybenzenes, tannins, novalac phenol-formaldehyde resins, hexamine and paraformaldehyde.

Extenders:
Examples of extenders are nut shell flour, Kaolin (clay), alkali metal salts, wheat flour, wood flour, bark flour, calcite and glass bubbles.

The gluing conditions for Examples 1 to 4 were as follows:
1. Spreading by roller spreader.
2. Glue spread weights as shown in individual examples.
3. Stand time of ten minutes after spreading and before cold pressing unless otherwise shown.
4. Cold press pressure 0.5 MPa for ten minutes.
5. Assembly time as detailed in examples.
6. Hot press pressure 1.0 MPa for *Pinus radiata* and *Pinus elliottii*, 1.4 MPa for Blackbutt.
7. Moisture meter readings (Delmhorst Model J-1) are the average of three determinations of each panel and to a depth of three gluelines.
8. All plywood samples block stacked for 16 hours prior to testing.

Assessment of bonding quality:
The bonding quality of the plywood specimens produced was assessed by the chisel test according to Australian Standards 2098.2 (1977) and 2754.1 (1985) unless otherwise mentioned.

EXAMPLE 1

Plywood samples were prepared by bonding veneers from Blackbutt (*Eucalyptus pilularis*) as representative of a high density "difficult to glue" wood species. The adhesive formulation contained either O (control), 0.1 or 0.2 parts of FC100 per 100 parts of resin PP775. The overall adhesive composition was comprised of 72.49% resin, 19.21% filler and extender, 1.7% accelerators, 6.6%, 6.53% or 6.45% sodium hydroxide and water and 0% 0.75% or 0.15% FC100. The glue spread was 430–440 grams per $m^2$ of double glueline.

The results are shown in Table 1.

TABLE 1

| WOOD SPECIES | | | | Surfactant | | Total | Hot Press | | Moisture | | Gluebond |
| --- | --- | --- | --- | --- | --- | --- | --- | --- | --- | --- | --- |
| Density ($kg/m^3$) | Moisture (%) | Water ($kg/m^3$) | Resin | Name | Concn (%) | Assembly Time (min) | Temp (°C.) | Time (min) | Meter Reading | Panel Construction | Quality (Average) |
| Blackbutt | | | | | | | | | | 3.2 mm veneer | |
| 890 | 5.5 | 48.9 | PP775 | FC100 | 0.01 | 25 | 140 | 10 | 26.0 | 5-ply | 7.25 |
|  |  |  | " | " | " | 45 | " | " | 25.0 | " | 8.00 |
|  |  |  | " | " | " | 65 | " | " | 24.5 | " | 7.75 |
|  |  |  | " | " | " | 85 | " | " | 24.0 | " | 7.00 |
|  |  |  | " | Control |  | 25 | " | " | 30+ | " | 6.00 |
|  |  |  | " | Control |  | 45 | " | " | 26.5 | " | 5.00 |
|  |  |  | " | Control |  | 65 | " | " | 25.0 | " | 2.75 |
|  |  |  | " | Control |  | 85 | " | " | 24.5 | " | 3.50 |
| 890 | 9.0 | 80.1 | " | FC100 | 0.01 | 25 | " | " | 27.0 | " | 6.25 |
|  |  |  | " | " | " | 45 | " | " | 26.0 | " | 8.00 |
|  |  |  | " | " | " | 65 | " | " | 26.0 | " | 7.50 |
|  |  |  | " | " | " | 85 | " | " | 25.5 | " | 9.00 |
|  |  |  | " | Control |  | 25 | " | " | 30+ | " | 6.25 |
|  |  |  | " | Control |  | 45 | " | " | 26.5 | " | 5.50 |
|  |  |  | " | Control |  | 65 | " | " | 26.5 | " | 5.50 |
|  |  |  | " | Control |  | 85 | " | " | 26.0 | " | 4.50 |
| 890 | 5.5 | 48.9 | " | FC100 | 0.01 | 35 | " | " | 27.0 | " | 5.75 |
|  |  |  | " | " | " | 55 | " | " | 26.0 | " | 6.25 |
|  |  |  | " | " | " | 75 | " | " | 24.5 | " | 7.50 |
|  |  |  | " | " | " | 95 | " | " | 22.5 | " | 6.50 |
| 890 | 5.5 | 48.9 | " | " | 0.2 | 35 | " | " | 25.2 | " | 6.75 |
|  |  |  | " | " | " | 55 | " | " | 25.0 | " | 6.75 |
|  |  |  | " | " | " | 75 | " | " | 24.0 | " | 7.75 |
|  |  |  | " | " | " | 95 | " | " | 22.0 | " | 7.25 |

The results show that the adhesive system of the invention satisfies the gluebond requirements for Type A bonded plywood (fully weather and boil proof) even when veneer with the high moisture content of 9.0% is used. Furthermore, they demonstrate that satisfactory Type A bonding can be achieved with this difficult to glue species in a total assembly time as low as 25 minutes.

EXAMPLE 2

The adhesive composition for Example 2 A–F contained 0.45 parts (solids basis) Gardinol CX and 0.10 parts FC100 per 100 parts of resin PP1597 or 0 parts of each surfactant as the control. The overall adhesive composition was comprised of 63.78% resin, 22.18% parts of extenders and sodium hydroxide, 13.69% water and 0.35% surfactants. For the control the total surfactant solids (0.35%) was replaced with Kaolin (0.35%). The glue spread was 430–440 grams per square meter of double glue line.

The adhesive composition for Example 2 G–H contained 1.00 parts (solids basis) Empicol LZ per 100 parts of resin PP1598 or 0 parts of surfactant as control. The overall adhesive composition was comprised of 70.67% resin, 17.67% extenders, 0.35% accelerators, 10.60% water and 0.71% surfactant. For the control the total surfactant solids (0.71%) was replaced with Kaolin (0.71%). The glue spread was 380–390 grams per square meter double glueline.

The results are provided in Table 2-1 and Table 2-2.

and those poor bonding glue lines improved markedly during the boil test cycle indicating insufficient cure during hot pressing. Examples G and H further highlighted the faster curing of surfactant-containing adhesives even at higher moisture content.

TABLE 2-2

| | Effect of surfactants on gelation time. | | | |
|---|---|---|---|---|
| Resin | Glue mix or resin | Surfactant* | Kaolin* | Gelation time at 100° C. |
| PP1597 | Glue mix | CX 0.9 | 0 | 12 min. 40 sec. |
| PP1597 | Glue mix | 0 | 0.9 | 12 min. 40 sec. |
| PP1597 | Resin | CX 0.9 | 0 | 30 min. 30 sec. |
| PP1597 | Resin | 0 | .0.9 | 30 min. 30 sec. |
| PP1597 | Resin | 0 | 0 | 32 min. 00 sec. |

*Solids basis

The table 2-2 reveals no effect on gelation time at 100° C. by the addition of surfactants either to the resin alone or in the adhesive formulation (glue mix) as used in the Example 2 A–F.

No affect on reduction in gelation time has been observed for any of the other described adhesive systems containing surfactants.

TABLE 2-1

| | | | | | | Reduction in pressing time with the use of surfactants. | | | | | | |
|---|---|---|---|---|---|---|---|---|---|---|---|---|
| WOOD SPECIES | | | | Surfactant | | Total | Hot Press | | Moisture | | | Gluebond |
| Density (kg/m³) | Moisture (%) | Water (kg/m³) | Resin | Name | Concn (%) | Assembly Time (min) | Temp (°C.) | Time (min) | Meter Reading | Panel Construction | | Quality (Average)** |
| A. *Pinus Radiata* 510 | 5.0 | 25.5 | PP1597 " " | Gardinol CX " " | 0.45 0.10 " " | 45 60 | 150 " | 5 14* | 24.5 24.5 | 2.6 mm veneer 7 ply 13 | | (6.0) (8.3) |
| B. *Pinus radiata* 510 | 5.0 | 25.5 | PP1597 " | Control " " | " | 45 | 150 " | 5 " | 24.5 | 2.6 mm veneer 7 ply | | (5.0) |
| C. *Pinus elliottii* 527 | 5.0 | 26.4 | PP1597 " " | Gardinol CX FC100 " " | 0.45 0.10 " " | 52 60 | 150 " | 5 14* | 22.0 21.0 | 2.6 mm veneer 7 ply 13 | | (8.2) (7.6) |
| D. *Pinus elliottii* 527 | 5.0 | 26.4 | PP1597 " | Control " | " | 52 | 150 " | 5 " | 22.5 | 2.6 mm veneer 7 ply | | (6.3) |
| E. *Pinus elliottii* 527 | 5.0 | 26.4 | PP1597 " | Gardinol CX FC100 " Control | 0.45 0.10 " | 45 " | 150 " | 5 " | | 2.6 mm veneer 7 ply " | | Dry Test (7.0) (4.7) |
| F. *Pinus elliotti* 527 | 5.0 | 26.4 | PP1597 " " | Gardinol CX FC100 " Control | 0.45 0.10 " | 45 " | 150 " | 5 " | | 2.6 mm veneer 7 ply " | | 72 hr Boil (7.3) " |
| G. *Pinus radiata* 510 | 11.8 | 60.2 | PP1598 " " | Empicol LZ 0.9% " " | | " 46 | " 150 | " 4m 45s | 27 | 3.2 mm veneer 5 ply | | Dry Test[3] (7.0) |
| H. *Pinus radiata* 510 | 11.8 | 60.2 | PP1598 | Control | | 46 | 150 | 4m 45s | 27 | 5 ply | | (3.8) |

[3]Wood Failure assessed dry after 16 hours block stacking.
*Usual hot press time for this construction without surfactants is 22 minutes.
**Individual glueline assessment minimum rating for any glueline is 2. Average of all gluelines must exceed 5.0.

Examples A, B, C and D indicate faster curing of centre gluelines by the addition of surfactants. Examples E and F are shown with both dry and 72 hours boil results. The dry testing revealed very poor bonding in the centre gluelines with the control compared with those containing surfactants

EXAMPLE 3

Plywood samples were prepared by bonding veneers from *Pinus radiata* as representative of a major softwood species. The adhesive formulation consisted of phenolic resin (100 parts) nut shell flour, wheat flour, sodium carbonate, kaolin, surfactant, accelerator (1. 0.4% for PP1604, 2. 0.5% for PP1598). Usual moisture content for gluing this species is 2%–5%.

Table 3 shows results of the use of various surfactants for higher than normal moisture content plywood gluing.

TABLE 3

Use of surfactants for gluing at higher than average moisture contents.

| WOOD SPECIES | | | | Surfactant | | Total | Hot Press | | Moisture | | Gluebond |
|---|---|---|---|---|---|---|---|---|---|---|---|
| Density (kg/m³) | Moisture (%) | Water (kg/m³) | Resin | Name | Concn (%) | Assembly Time (min) | Temp (°C.) | Time (min) | Meter Reading | Panel Construction | Quality (Average) |
| A. *Pinus radiata* | | | PP1604 | Empicol LS 30/P FC129 | 0.9 0.005 | | | | | 3.2 mm veneer | |
| 510 | 12.0 | 61.2 | " | " | " | 60* | 154 | 10 | 25.0 | 5 ply | 6.6 |
| " | " | " | " | " | " | 60** | " | " | 25.0 | " | 6.9 |
| " | " | " | " | " | " | 60*** | " | " | 24.5 | " | 7.2 |
| " | " | " | " | " | " | 120* | " | " | 25.0 | " | 8.2 |
| " | " | " | " | " | " | 120** | " | " | 25.5 | " | 8.4 |
| B. *Pinus radiata* | | | PP1597 | Empicol LS 30/P | 0.9% | | | | | | |
| 510 | 12.0 | 61.2 | " | " | " | 30 | 154 | 8 | 20.0 | " | 7.0 |
| " | " | " | " | " | " | 45 | " | " | 25.0 | " | 7.8 |
| " | " | " | " | " | " | 95 | " | " | 25.0 | " | 6.8 |
| C. *Pinus radiata* | | | PP1598 | Gardinol CX FC100 | 0.45% 0.10% | | 145 | 7 | | 2.6 mm veneer | |
| 510 | 11.0 | 56.1 | " | " | " | 60 | " | " | 25.0 | 5 ply | 7.3 |
| " | " | " | " | " | " | 90 | " | " | 25.0 | " | 7.3 |

*2 minutes stand time between spreading and cold pressing 0.5 MPa 10 m
**10 minutes stand time between spreading and cold pressing 0.5 MPa 10 m
***15 minutes stand time between spreading and cold pressing 0.5 MPa 10 m

EXAMPLE 4

The effect of various surfactants on gluebond quality was investigated. Table 4 indicates that none of the surfactants tested have an adverse effect on gluebond quality.

The formulation used for table 4 is the same as for example 2 G–H except for any difference in surfactant concentration.

TABLE 4

Effects of Various surfactants.

| WOOD SPECIES | | | | Surfactant | | Total | Hot Press | | Moisture | | Gluebond |
|---|---|---|---|---|---|---|---|---|---|---|---|
| Density (kg/m³) | Moisture (%) | Water (kg/m³) | Resin | Name | Conc. (%) | Assembly Time (min) | Temp (°C.) | Time (min) | Meter Reading | Panel Construction | Quality (Average) |
| *Pinus radiata* | | | | | | | | | | All 2.6 mm veneer | |
| 510 | 5.8 | 29.6 | PP1598 | Gardinol CX | 0.9 | 27* | 140 | 5 | 25.5 | 5 ply | 5.3 |
| " | " | " | " | " | " | 33 | " | " | 24.5 | " | 6.0 |
| " | " | " | " | " | " | 65 | " | 5 | 23.0 | " | 7.3 |
| *Pinus elliottii* | | | " | " | " | 38* | 140 | 5 | 24.5 | " | 9.3 |
| 527 | 4.1 | 21.6 | " | " | " | 43 | " | " | 22.5 | " | 7.5 |
| " | " | " | " | " | " | 60 | " | " | 20.5 | " | 7.5 |
| *Pinus radiata* | | | PP1598 | Empicol LS 30/P | 0.9 | 27* | 140 | 5 | 24.0 | 5 ply | 6.8 |
| 510 | 5.8 | 29.6 | " | " | " | 33 | " | " | 24.5 | " | 5.5 |
| " | " | " | " | " | " | 65 | " | " | 22.5 | " | 5.8 |
| *Pinus elliotti* | | | " | " | " | 38* | " | " | 21.0 | " | 7.5 |
| 527 | 4.1 | 21.6 | " | " | " | 43 | " | " | 22.5 | " | 7.0 |
| " | " | " | " | " | " | 60 | " | " | 22.5 | " | 7.3 |
| *Pinus radiata* | | | PP1598 | Gardinol CX FC100 | 0.45 0.10 | 27* | 140 | 5 | 25.0 | 5 ply | 6.5 |
| 510 | 5.8 | 29.1 | " | " | " | 33 | " | " | 25.5 | " | 6.5 |
| " | " | " | " | " | " | 65 | " | " | 24.5 | " | 8.3 |
| *Pinus elliottii* | | | " | " | " | 38* | " | " | 21.5 | " | 8.0 |
| 527 | 4.1 | 21.6 | " | " | " | 43 | " | " | 22.5 | " | 6.8 |
| " | " | " | " | " | " | 60 | " | " | 19.5 | " | 6.5 |

TABLE 4-continued

| WOOD SPECIES | | | | Surfactant | | Total | Hot Press | | Moisture | | Gluebond |
|---|---|---|---|---|---|---|---|---|---|---|---|
| Density (kg/m³) | Moisture (%) | Water (kg/m³) | Resin | Name | Conc. (%) | Assembly Time (min) | Temp (°C.) | Time (min) | Meter Reading | Panel Construction | Quality (Average) |

Effects of Various surfactants.

*2 minutes stand time between spreading and cold pressing for 10 minutes at 0.5 MPa all other samples 10 minutes stand time followed by same cold press conditions as 2 min.
Tested after 72 hours: exposure to boiling water - all samples.

EXAMPLE 5

Finger jointed samples were prepared by bonding *Eucalyptus regnans* of 12% moisture content as representative of a major hardwood species (density 680 kg/m³). The adhesive consisted of resorcinol-formaldehyde resin (100 parts) nut shell flour and paraformaldehyde.

The results provided in Table 5 are averages of a commercial factory trial.

water and 0.71% surfactant. The glue spread was 240 grams per square meter of single glueline. Usual hot press time for this Laminated Veneer Lumber (LVL) construction without surfactants is 47 minutes at 180° C.

The results are provided in Table 6.

TABLE 5

| WOOD SPECIES | | | | Surfactant | | Total | Hot Press | | Moisture | | Average Modulus |
|---|---|---|---|---|---|---|---|---|---|---|---|
| Density (kg/m³) | Moisture (%) | Water (kg/m³) | Resin | Name | Conc. (%) | Assembly Time (min) | Temp (°C.) | Time (hrs) | Meter Reading | Panel Construction | of Rupture 4 Point bend |
| *Eucalyptus regnans* 680 | 12.0 | 81.6 | PR900 " | FC100 " | 0.08 " | NA " | 25 " | 16 " | NA " | Finger joint " | 60.3 MPa* |
| *Eucalyptus regnans* 680 | 12.0 | 81.6 | PR900 " | Control " | " | NA " | 25 " | 16 " | NA " | " | 31.1 MPa* |

*Average modulus of rupture (MOR) or 70 mm wide by 35 mm thick samples. Tested by 4 point bending, 750 mm span. Test according to Australian Standard AS1328 (1987).

EXAMPLE 6

The adhesive composition for Example 6 contained 1.0 parts (solids basis) Empicol LZ per 100 parts of resin PP1598. The overall adhesive composition was comprised of 70.67%, 17.67% extenders, 0.35% accelerators, 10.60%

TABLE 6

Effect of surfactants on faster curing for LVL.

| WOOD SPECIES | | | | Surfactant | | Total | Hot Press | | Moisture | | Gluebond |
|---|---|---|---|---|---|---|---|---|---|---|---|
| Density (kg/m³) | Moisture (%) | Water (kg/m³) | Resin | Name | Conc. (%) | Assembly Time (min) | Temp (°C.) | Time (min) | Meter Reading | Panel Construction | Quality (Average) |
| *Pinus radiata* 510 " | 4.0 " | 20.4 " | PP1598 " | Empicol " | 1.0 " | 35*¹ 30*² | 180 " | 35 38 | — — | 3 mm veneer 21 ply " | See Below See Below |

| | Gluebond Quality | | | |
|---|---|---|---|---|
| | Hot Press Time 35 Mins | | Hot Press Time 38 Mins | |
| Glueline | VPS | 72 Hours Boil | Dry | 72 Hours Boil |
| 1 | 7 | 7 | 8 | 9 |
| 2 | 8 | 7 | 9 | 9 |
| 3 | 7 | 8 | 8 | 8 |
| 4 | 10 | 9 | 8 | 7 |
| 5 | 10 | 9 | 8 | 8 |
| 6 | 9 | 8 | 9 | 9 |
| 7 | 7 | 9 | 8 | 7 |
| 8 | 6 | 8 | 7 | 8 |
| 9 | 4 | 7 | 7 | 7 |
| 10 | 8 | 8 | 8 | 9 |
| 11 | 9 | 9 | 7 | 8 |

TABLE 6-continued

| | Effect of surfactants on faster curing for LVL. | | | |
|---|---|---|---|---|
| 12 | 10 | 5 | 8 | 8 |
| 13 | 7 | 4 | 5 | 8 |
| 14 | 7 | 6 | 8 | 8 |
| 15 | 8 | 10 | 9 | 8 |
| 16 | 7 | 8 | 8 | 7 |
| 17 | 6 | 6 | 9 | 9 |
| 18 | 7 | 6 | 8 | 8 |
| 19 | 7 | 9 | 9 | 8 |
| 20 | 8 | 8 | 9 | 10 |
| Average | 7.60 | 7.55 | 8.00 | 8.20 |

*[1]Open Assembly time - 5 mins.
*[2]Open Assembly time - 10 mins.

It will be clear to the reader that various modifications may be made to the particular embodiments described above without departing from the spirit and scope of the present invention.

We claim:

1. A wood adhesive composition for bonding wood-based materials, said composition comprising an aqueous based thermosettable resin adhesive and a fluorochemical surfactant.

2. A composition according to claim 1 wherein the thermosettable resin is a urethane resin.

3. A wood adhesive composition for bonding wood-based materials, said composition comprising an aqueous based thermosettable resin adhesive and a fluorochemical surfactant wherein the thermosettable resin is an aldehyde condensation resin.

4. A composition according to claim 3 wherein the surfactant is present in an amount of about 0.001 to 0.500%.

5. A composition according to claim 3 wherein the aldehyde condensation resin is selected from the group comprising phenol-formaldehyde resin, melamine-formaldehyde resin, urea formaldehyde resin, resorcinol formaldehyde resin, natural polyphenolic resin and mixtures thereof.

6. A composition according to claim 3 wherein the resin contains methylol or aldehyde groups, the wood-based material optionally contains extractives and the composition further comprises a compound capable of reacting with aldehyde or methylol groups and/or any extractives present in the wood-based materials.

7. A method for bonding wood-based materials, said method including the steps of:
  (a) applying a hydrophilic anionic surfactant having an HLB of at least about 10 to at least a portion of the surface of the wood-based material; and
  (b) applying an aqueous thermosettable resin adhesive to at least a portion of the surfactant treated surface.

8. A method according to claim 7 wherein at least a part of the hydrophilic anionic surfactant is contained in the aqueous adhesive.

9. A method according to claim 7 wherein step (a) is carried out prior to step (b).

10. A method according to claim 7 wherein the surfactant is one having an HLB greater than about 20.

11. A method according to claim 10 wherein the surfactant is a hydrocarbon derived surfactant having a carbon chain comprising 6 to 26 carbon atoms.

12. A method according to claim 10 wherein the surfactant is an alkali metal salt of an alkyl sulphate.

13. A method according to claim 10 wherein the surfactant is present in an amount of about 0.1 to 2.0%.

14. A method according to claim 7 wherein the surfactant is a fluorochemical surfactant.

15. A method according to claim 14 wherein the surfactant is present in an amount of about 0.001 to 0.500%.

16. A method according to claim 7 wherein the thermosettable resin is an aldehyde condensation resin.

17. A method according to claim 16 wherein the aldehyde condensation resin is selected from the group comprising phenol-formaldehyde resin, melamine-formaldehyde resin, urea formaldehyde resin, resorcinol formaldehyde resin, natural polyphenolic resin and mixtures thereof.

18. A method according to claim 7 wherein the thermosettable resin is a urethane resin.

19. A method according to claim 7 wherein the wood-based material optionally contains extractives and the adhesive composition further comprises compounds capable of reacting with aldehyde or methylol groups and/or any extractives present in the wood-based materials.

20. A method according to claim 7 wherein the wood-based materials are wood.

21. A method according to claim 20 wherein the wood is a high density wood.

22. A method according to claim 20 wherein the wood has a moisture content in the range of 0 to 20%.

23. A method according to claim 20 wherein the wood is selected from a wood which is used to manufacture plywood.

24. A method according claim 22 wherein the surfactant is present in an amount of about 0.1 to 2.0%.

25. A method for reducing the timber veneer bond cure time of an aqueous thermosettable adhesive resin composition comprising adding one or more hydrophilic anionic surfactant(s) having an HLB greater than about 10 to said resin composition.

26. A method according to claim 25 wherein the hydrophilic surfactant has an HLB greater than about 20.

27. A method according to claim 26 wherein the surfactant is a hydrocarbon derived surfactant having a carbon chain comprising 6 to 26 carbon atoms.

28. A method according to claim 26 wherein the surfactant is an alkali metal salt of an alkyl sulphate.

29. A method according to claim 25 wherein the surfactant is a fluorochemical surfactant.

30. A method according to claim 29 wherein the surfactant is present in an amount of about 0.001 to 0.500%.

31. A method according to claim 25 wherein the thermosettable resin is an aldehyde condensation resin.

32. A method according to claim 31 wherein the aldehyde condensation resin is selected from the group comprising phenol-formaldehyde resin, melamine-formaldehyde resin, urea formaldehyde resin, resorcinol formaldehyde resin, natural polyphenolic resin and mixtures thereof.

33. A method according to claim 25 wherein the thermosettable resin is a urethane resin.

34. A method according to claim 25 wherein the adhesive composition further comprises compounds capable of reacting with aldehyde or methylol groups and/or any extractives present in the wood-based materials.

35. A method for bonding timber veneer comprising:

applying an aqueous thermosettable resin adhesive comprising at least one hydrophilic anionic surfactant having an HLB value greater than about 10 to at least one surface of the veneer;

contacting the thus coated surface with the surface of an adjacent sheet; and applying heat and pressure to the sheets so as to effect bonding.

36. A method according to claim 35 wherein the hydrophilic surfactant is a surfactant having an HLB number of greater than about 20.

37. A method according to claim 35 wherein the surfactant is a hydrocarbon derived surfactant having a carbon chain comprising 6 to 26 carbon atoms.

38. A method according to claim 36 wherein the surfactant is an alkali metal salt of an alkyl sulphate.

39. A method according to claim 36 wherein the surfactant is present in an amount of about 0.1 to 2.0%.

40. A method according to claim 35 wherein the surfactant is a fluorochemical surfactant.

41. A method according to claim 40 wherein the surfactant is present in an amount of about 0.001 to 0.500%.

42. A method according to claim 35 wherein the thermosettable resin is an aldehyde condensation resin.

43. A method according to claim 42 wherein the aldehyde condensation resin is selected from the group comprising phenol-formaldehyde resin, melamine-formaldehyde resin, urea formaldehyde resin, resorcinol formaldehyde resin, natural polyphenolic resin and mixtures thereof.

44. A method according to claim 35 wherein the thermosettable resin is a urethane resin.

45. A method according to claim 35 wherein the wood-based material optionally contains extractives and the adhesive composition further comprises compounds capable of reacting with aldehyde or methylol groups and/or any extractives present in the wood-based materials.

46. A method for bonding timber veneer comprising:

(1) applying a hydrophilic anionic surfactant with an HLB value of at least 10 to the veneer surfaces to be bonded, (2) applying to at least one of the veneer surfaces to be bonded, an aqueous thermosettable resin adhesive, (3) contacting the thus coated surface with the surface of an adjacent sheet, and (4) applying heat and pressure to the sheets to effect bonding.

* * * * *